US007961593B2

(12) United States Patent
Porat et al.

(10) Patent No.: US 7,961,593 B2
(45) Date of Patent: Jun. 14, 2011

(54) DOWNLINK ACQUISITION

(75) Inventors: Ron Porat, San Diego, CA (US); Yu Wen, Calgary (CA); Peter J. Graumann, Calgary (CA); Srikanth Gummadi, San Diego, CA (US)

(73) Assignee: Wi-Lan, Inc., Ottawa, Ontario (CA)

( * ) Notice: Subject to any disclaimer, the term of this patent is extended or adjusted under 35 U.S.C. 154(b) by 687 days.

(21) Appl. No.: 12/021,167

(22) Filed: Jan. 28, 2008

(65) Prior Publication Data
US 2009/0190465 A1 Jul. 30, 2009

(51) Int. Cl.
*H04J 11/00* (2006.01)
(52) U.S. Cl. ......... 370/210; 370/514; 370/516; 375/354
(58) Field of Classification Search .................. 370/203, 370/208, 210, 503–516; 375/316, 354
See application file for complete search history.

(56) References Cited

U.S. PATENT DOCUMENTS

| | | | | |
|---|---|---|---|---|
| 6,658,063 | B1 * | 12/2003 | Mizoguchi et al. | 375/260 |
| 7,391,828 | B2 * | 6/2008 | Liu et al. | 375/342 |
| 7,480,234 | B1 * | 1/2009 | Hart et al. | 370/208 |
| 7,613,104 | B2 * | 11/2009 | Bhatt et al. | 370/208 |
| 7,634,034 | B2 * | 12/2009 | Larsson | 375/362 |
| 7,769,119 | B2 * | 8/2010 | Chun et al. | 375/354 |
| 7,778,153 | B2 * | 8/2010 | Choi et al. | 370/210 |
| 2004/0005018 | A1 | 1/2004 | Zhu et al. | |
| 2004/0100898 | A1 | 5/2004 | Anim-Appiah et al. | |
| 2005/0008088 | A1 | 1/2005 | Liu et al. | |
| 2006/0171367 | A1 | 8/2006 | Wang | |
| 2007/0060050 | A1 * | 3/2007 | Lee et al. | 455/13.1 |
| 2008/0019458 | A1 * | 1/2008 | Kuo et al. | 375/285 |
| 2008/0043709 | A1 * | 2/2008 | Zhou et al. | 370/348 |
| 2008/0304604 | A1 * | 12/2008 | Oh | 375/345 |
| 2009/0175372 | A1 * | 7/2009 | Moon et al. | 375/260 |

FOREIGN PATENT DOCUMENTS

WO 2004-049652 6/2004
WO 2007-004910 1/2007

OTHER PUBLICATIONS

Form PCT/ISA/220 Notification of Transmittal of the International Search Report and the Written Opinion of the International Searching Report, or the Declaration, mailed Jun. 24, 2009 for corresponding PCT Application PCT/US2009/032165.

* cited by examiner

*Primary Examiner* — William Trost, IV
*Assistant Examiner* — Roberta A Shand
(74) *Attorney, Agent, or Firm* — Volpe and Koenig, P.C.

(57) ABSTRACT

The subject matter disclosed herein provides methods and apparatus, including computer program products, for detecting a preamble to enable acquisition of a downlink. In one aspect, there is provided a method. The method may include receiving a plurality of symbols. From an autocorrelation of the received symbols, a guard interval may be detected. The guard interval may represent a receive/transmit transition gap (RTG). A metric may be used to verify whether at least one symbol positioned after the detected guard interval is a preamble. Related systems, apparatus, methods, and/or articles are also described.

17 Claims, 8 Drawing Sheets

DOWNLINK ACQUISITION

FIELD

The subject matter described herein relates to wireless communications.

BACKGROUND

WiMAX is a wireless digital communications system. WiMAX is defined by a family of standards and guidelines, including the Institute of Electrical and Electronic Engineers (IEEE) Standard for Local and metropolitan area networks, Part 16: Air Interface for Fixed Broadband Wireless Access Systems, 1 Oct. 2004 ("IEEE 802.16-2004") and IEEE Standard for Local and metropolitan area networks, Part 16: Air Interface for Fixed and Mobile Broadband Wireless Access Systems, 26 Feb. 2006, ("IEEE 802.16e-2005"). WiMAX provides broadband wireless access up to about 30 miles for fixed subscriber stations, and about 10 miles for mobile stations. In contrast, WiFi provides a wireless local area network standard with access limited to about 300 feet. WiMAX also provides rates that are comparable to WiFi, but WiMAX includes features to minimize interference, such as multipath, which becomes more predominant in a communication system as link distance increases.

SUMMARY

The subject matter disclosed herein provides methods and apparatus, including computer program products, for detecting a preamble to enable acquisition of a downlink.

In one aspect, there is provided a method. The method may include receiving a plurality of symbols. From an autocorrelation of the received symbols, a guard interval may be detected. The guard interval may represent a receive/transmit transition gap (RTG). A metric may be used to verify whether at least one symbol positioned after the detected guard interval is a preamble.

The details of one or more variations of the subject matter described herein are set forth in the accompanying drawings and the description below. Features and advantages of the subject matter described herein will be apparent from the description and drawings, and from the claims.

Figure 1:
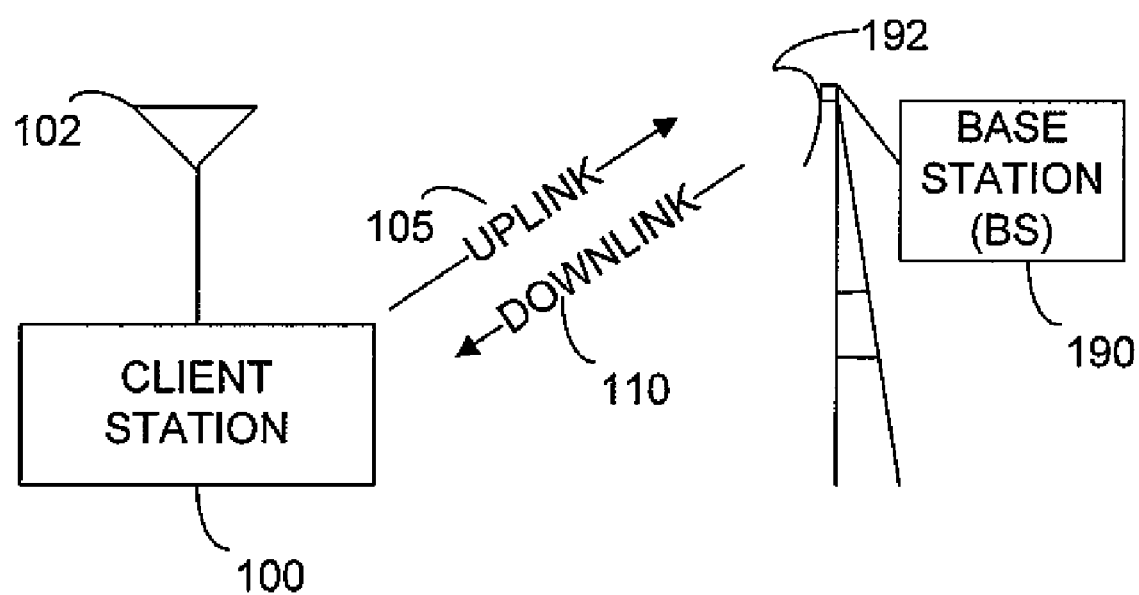
FIG. 1 depicts an example of a network including a client station and a base station.

Like labels are used to refer to same or similar items in the drawings.

DETAILED DESCRIPTION

FIG. 1 depicts a block diagram of a wireless network including a client station 100 and a base station 190. Client station 100 uses communication links, such as uplink 105 to base station 190 and downlink 110 from base station 190, to communicate with base station 190. The term "communicate" refers to at least one of providing information and receiving information. Information refers to any data, including voice, video, images Internet Protocol (IP) packets, control information, and any other data capable of being transmitted or received by client station 100. Client station 100 and base station 190 may further include antennas 102 and 192, respectively. Although FIG. 1 depicts only a single base station 190 and a single client station 100, the network of FIG. 1 may include a plurality of client stations and base stations.

In some implementations, client station 100 may transmit to and receive from one or more base stations, such as base station 190. For example, client station 100 may be implemented as a wireless device (e.g., a mobile phone, a smart phone, and the like), a wireless data card (or chip) of a computer, a wireless data card (or card) of a game device (e.g., a PlayStation), or any other device capable of transmitting to and receiving from a base station.

Client station 100 may also be implemented as a client station consistent with the WiMAX family of standards and guidelines. The phrase "WiMAX family of standards and guidelines" refers to one or more of the following: IEEE 802.16-2004 and IEEE 802.16e-2005. Although client station 100 may communicate while in motion, client station 100 may be stationary as well.

Base station 190 may transmit to and receive from one or more client stations, such as client station 100. Base station 190 may also be coupled to other networks, such as an access service network (ASN) coupling one or more base stations to a gateway interfacing another network, such as an Internet Protocol (IP) network, the Internet, the public switched telephone network (PSTN), and the like. In some implementations, base station 190 may be implemented as a base station consistent with the WiMAX family of standards and guidelines, although the base station may support other standards as well.

The downlink 110 and uplink 105 each represent a radio frequency (RF) signal. The RF signal may include information, such as data, voice, video, images, Internet Protocol (IP) packets, control information, and the like. Moreover, the RF signal may use orthogonal frequency division multiplexing (OFDM) (or orthogonal frequency division multiple access (OFDMA)). OFDM uses a plurality of sub-carriers, each of which is modulated by another modulation scheme, such as BPSK (binary phase shift keying), QPSK (quadrature phase shift keying), QAM (quadrature amplitude modulation), and the like.

WiMAX uses OFDM as a physical layer digital modulation scheme. For example, downlink 110 and uplink 105 may each be a RF signal implemented as OFDM, including subcarrier signals modulated using BPSK, QPSK, QAM, and the like. These modulated sub-carriers include information being transmitted from the base station 190 to the client station 100, and from client station 100 to base station 190.

Antennas 102 and 192 may be implemented as any type of antenna, including a multiple input multiple output antenna system (MIMO), although a single antenna may be used as well.

When base station 190 communicates with client station 100, client station 100 detects a preamble. The preamble enables a so-called "synchronization" between client station 100 and base station 190. For example, client station 100 may detect the preamble of a frame to determine where the information starts in a received downlink 110. The term "frame" refers to a structure of information, which may include a preamble to define the start (e.g., beginning) of the frame.

Figure 2:
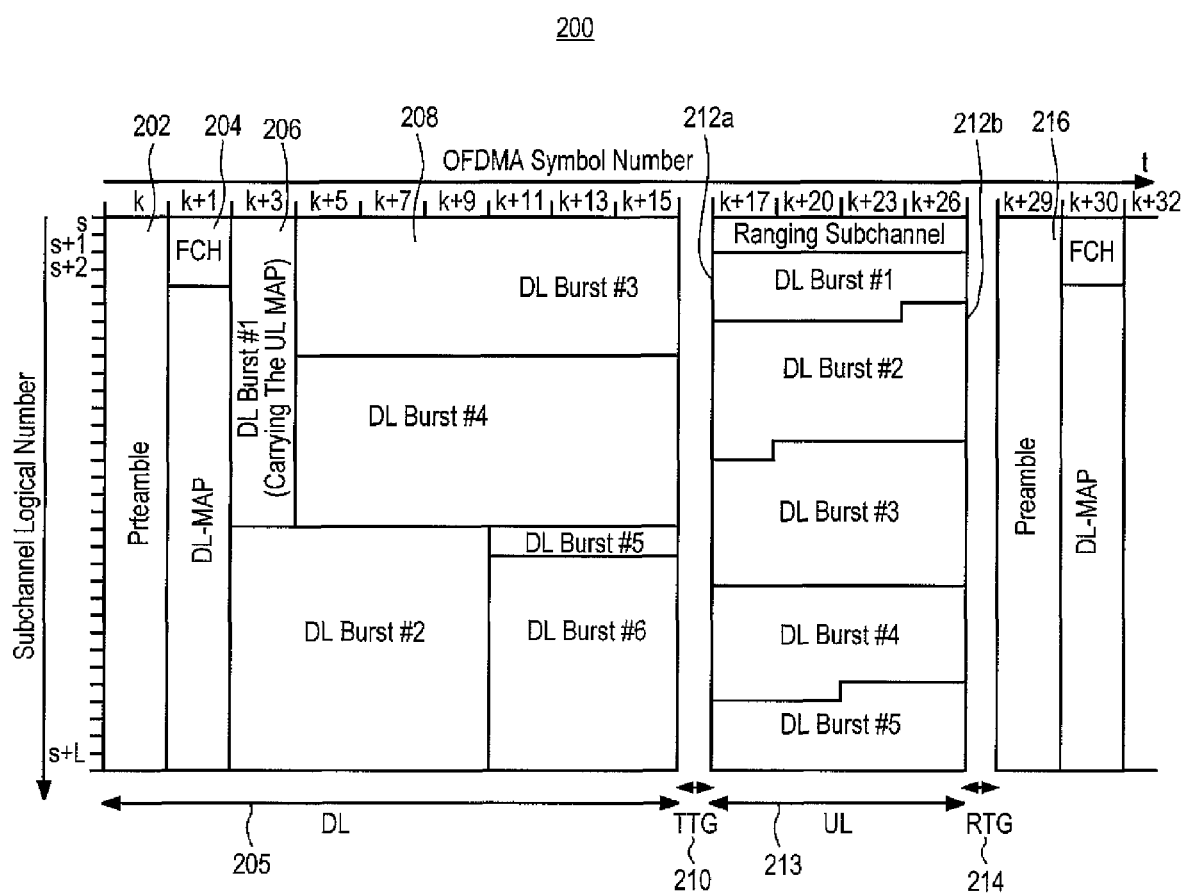
FIG. 2 depicts a frame, including a preamble and guard intervals, used when communicating between a client station and a base station.

FIG. 2 depicts an example of a frame 200. Frame 200 is consistent with the WiMAX family of standards and guidelines, such as IEEE 802.16e-2005. Frame 200 includes a downlink region 205 and an uplink region 213. Downlink region 205, as illustrated, includes a preamble 202 and a frame control header 204 (labeled FCH), including control information (e.g., a base station identifier and other control information to enable client station 100 to decode frame 200). Preamble 202 and FCH 204 may be followed by one or more bursts of one or more symbols of downlink 110. FIG. 2 depicts a plurality of exemplary bursts of symbols (e.g., DL burst #1 206 and DL burst #3 208) sent through downlink 110. FIG. 2 also depicts downlink map messages (labeled DL-MAP) and uplink map messages (labeled "UL MAP") providing messages to allocate to users (i.e., clients) portions of the downlink region 205 and the uplink region 213 respectively.

After downlink region 205, frame 200 includes a guard interval, such as a transmit/receive transition gap (TTG) 210. When the guard interval is implemented as a TTG, TTG 210 represents a gap between the last symbol of the downlink burst(s) in the downlink region 205 (e.g., the last symbol of DL burst #3 208) and the first subsequent symbol of an uplink burst (e.g., symbols 212a or b) in the uplink region 213.

In some implementations, base station 190 uses time division duplexing (TDD) to transmit downlink 110 and receive uplink 105 on the same radio frequency TTG 210 may provide time to enable base station 190 to switch from a downlink transmit mode to an uplink receive mode and provide time to enable client station 100 to switch from a receive mode to a transmit mode.

After TTG 210, client station 100 may transmit to base station 190 uplink 105 including one or more bursts of one or more symbols (labeled UL bursts #1 212a, UL bursts #1 212b, and so forth). Although FIG. 2 depicts uplink region 213 including a ranging sub-channel, the ranging subchannel may be implemented using other mechanisms as well.

After one or more bursts of symbols 212a-b, frame 200 may include another guard interval, such as a receive/transmit transition gap (RTG) 214. In implementations where the guard interval is a RTG, RTG 214 represents a gap between the last symbol of the uplink burst (e.g., UL bursts #1 212a or UL bursts #1 212b) of uplink region 213 and a subsequent preamble 216. When base station 190 uses time division duplexing (TDD), the RTG may provide time for base station 190 to switch from a receive mode to a transmit mode and time for client station 100 to switch from a transmit mode to a receive mode.

Figure 3:
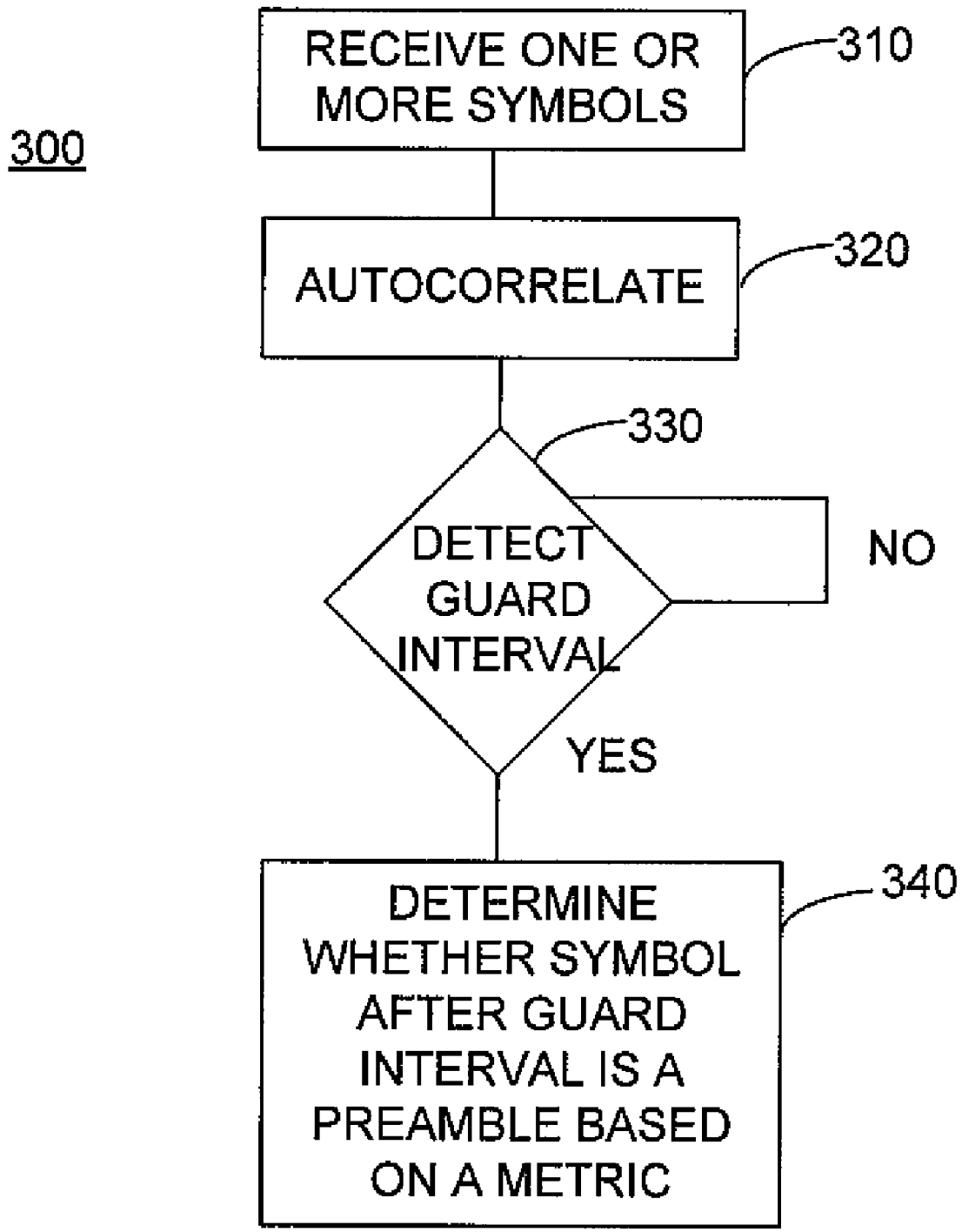
FIG. 3 depicts a process for detecting a guard interval, such as a receive/transmit transition gap.

FIG. 3 depicts a process 300 for detecting a preamble to enable acquisition of the downlink 110. Detection of the preamble enables client station 100 to acquire downlink 110 and synchronize to base station 190—locating thus the start of a frame, such as frame 200.

At 310, a client station receives a downlink. For example, client station 100 may receive at antenna 102 downlink 110 as an OFDM signal transmitted by base station 190. The received downlink 110 may be processed by an analog-to-digital converter and other components (e.g., mixers) to provide samples corresponding to one or more symbols. The term "sample" refers to sample values, one or more of which may form a symbol. These samples may be complex samples, such as I samples and Q samples, representing real components and imaginary components.

At 320, client station 100 may perform an autocorrelation of one or more symbols. Autocorrelation refers to a correlation of one or more symbols with itself. To perform an autocorrelation, client station 100 may correlate a symbol using a cyclic prefix (CP) autocorrelation (described further below with respect to FIG. 5 at 515), although other forms of correlation may be used as well. The autocorrelation provides an output, including one or more peaks corresponding to aspects of frame 200.

Figure 4:
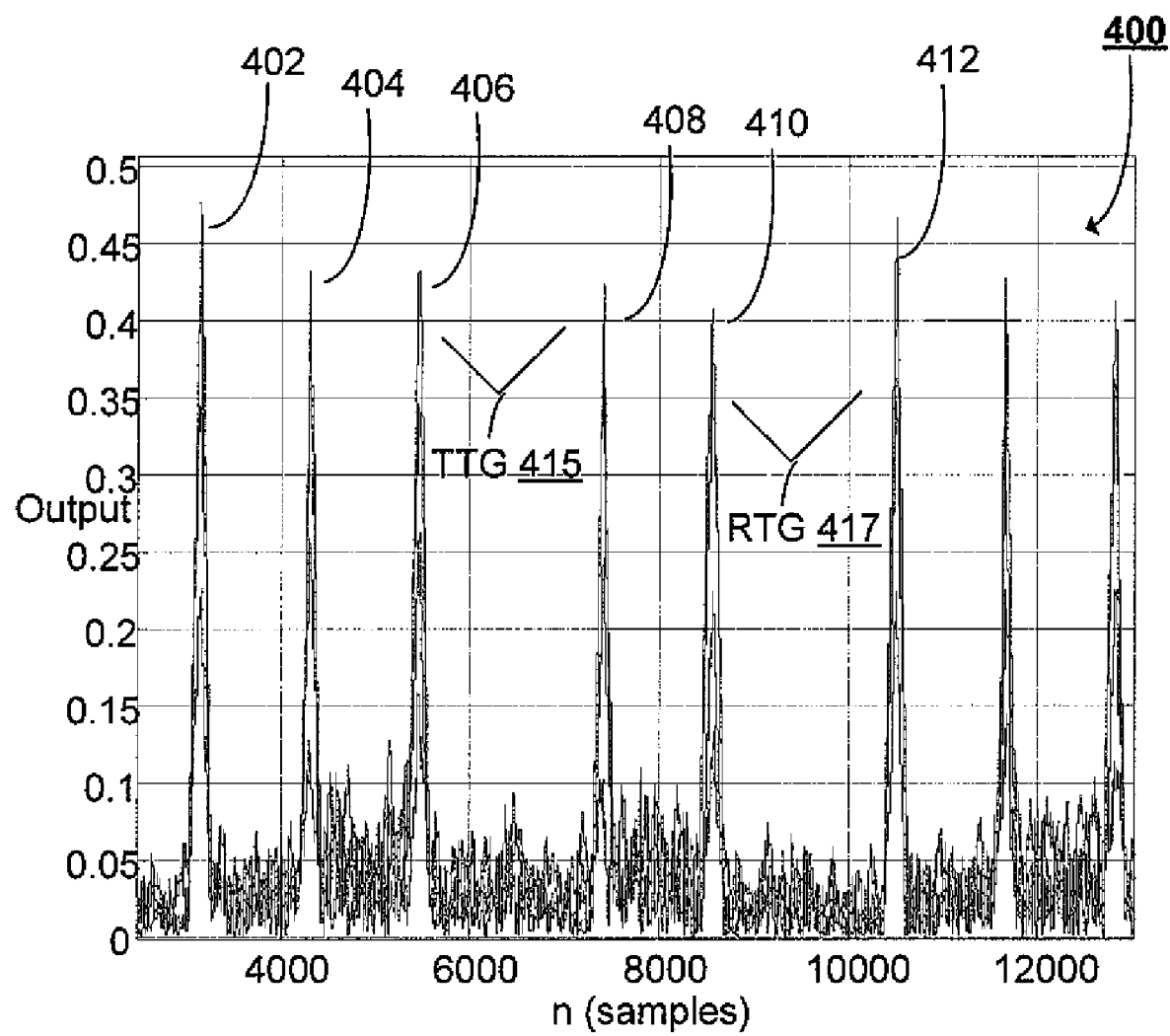
FIG. 4 depicts an output of an autocorrelator.

FIG. 4 depicts an example plot of a signal 400 output by a CP autocorrelator. The x-axis corresponds to a sample index, and the y-axis corresponds to magnitude (e.g., in dB, volts, and the like).

At 330, client station 100 may detect a guard interval, such as RTG 214. To detect RTG 214, client station 100 may use the output of a CP autocorrelator, although other correlator outputs may be used as well. The CP autocorrelator may output a signal, such as signal 400, including one or more peaks 402-412. These peaks 402-412 may be used to determine the location of aspects of a frame, such as preamble 202. The locations of peaks 402-412 and the corresponding distances among peaks 402-412 may be used to determine the location of a guard interval, such as TTG 210 and RTG 214.

For example, signal 400 represents an example output of a CP autocorrelator over a short frame including a preamble 402, 2 symbols 404 and 406 of a downlink burst, and two symbols 408 and 410 of an uplink burst. Peak 402 thus represents a preamble, such as preamble 202 (FIG. 2). Peaks 404 and 406 represent DL burst #1 206 and DL burst #3 208 in downlink region 205, and peaks 408 and 410 represent UL burst #1 212a and UL burst 212b of uplink region 213. Peak 412 represents a preamble 216 of another, subsequent frame.

When the distance from a peak to another peak exceeds a threshold distance, then the second peak is likely to be caused by either an uplink data symbol or a preamble, and a guard interval (e.g., a TTG or RTG) is likely to exist between the peaks. For example, the distance between peak 406 and peak 408 exceeds the threshold distance and thus corresponds to a guard interval, such as TTG 415 (see also FIG. 2 at TTG 210). The distance between peak 410 and 412 also exceeds a threshold distance and thus corresponds to another guard interval, such as RTG 417 (see also FIG. 2 at RTG 214).

At 340, client station 100 determines, based on a metric, whether one or more symbols 412 after the detected guard interval 417 and symbol 408 after the detected guard interval 415 corresponds to a preamble, such as preamble 216. The determined metric verifies that the one or more symbols at 412 are indeed a preamble, such as preamble 216.

To determine whether one or more symbols after a detected guard interval represents a preamble, client station 100 may determine whether the one or more symbols are BPSK modulated or use some other complex modulation, such as QPSK, QAM, QAM16, QAM64, and the like. For example, in WiMAX, the preamble is modulated onto sub-carriers using BPSK. BPSK is a modulation scheme using real numbers, such as +1 and −1. In WiMAX, symbols other than the preamble are modulated based on a complex modulation scheme using complex components, such as I components and Q components.

A metric may be used to determine whether the one or more symbols after a detected guard interval correspond to BPSK modulation—verifying thus the detection of the preamble. The metric provides an indication that the modulation uses real numbers rather than complex components (e.g., real and imaginary numbers, I components and Q components, and the like). When the metric indicates BPSK modulation, client station 100 detects those symbols as a preamble. The detection of the preamble, such as preamble 216, enables client station 100 to acquire a downlink (e.g., determine the start of a frame in downlink 110).

Figure 5:
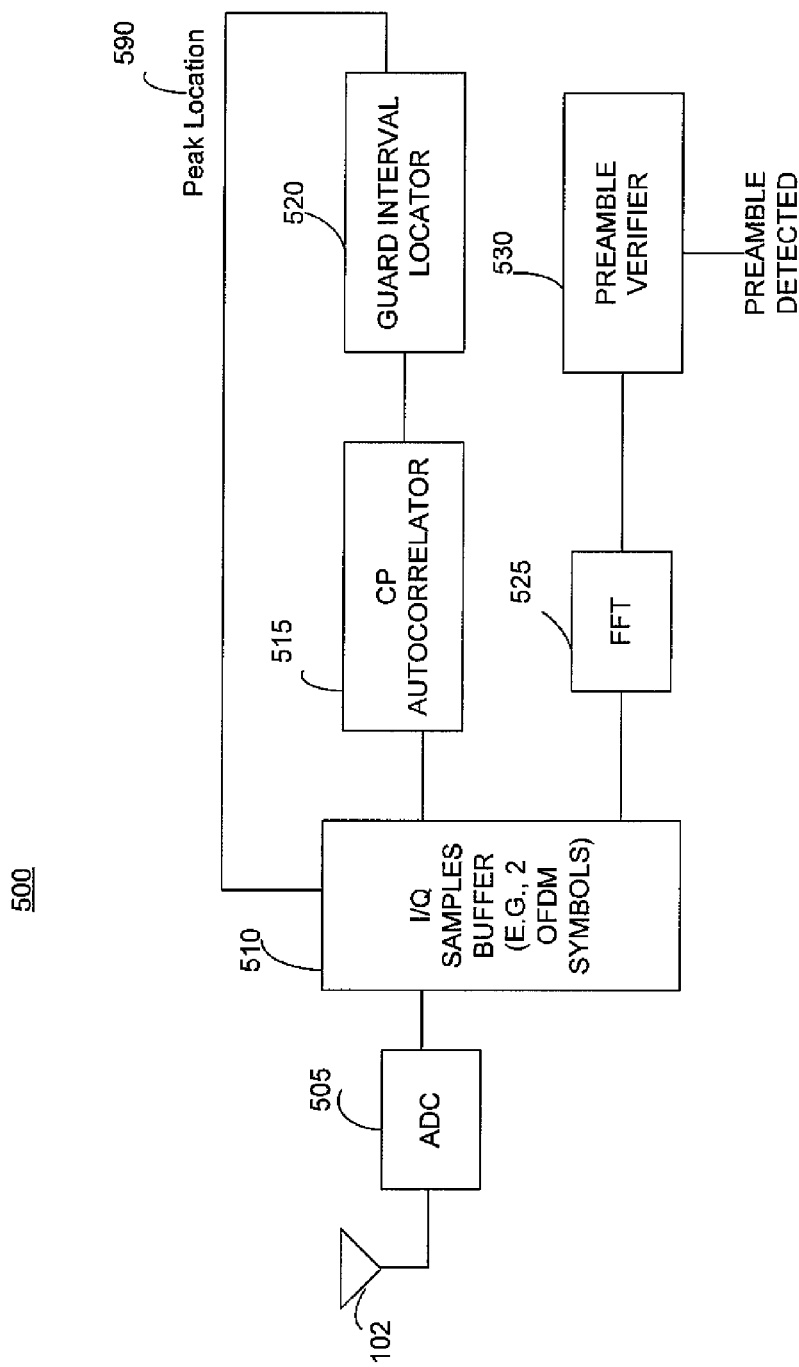
FIG. 5 depicts a receiver for detecting a guard interval, such as a receive/transmit transition gap.

FIG. 5 depicts a system 500 including antenna 102, an analog-to-digital converter 505 (labeled ADC), a buffer 510, a CP autocorrelator 515, a guard interval locator 520, an FFT 525, and a preamble verifier 530. System 500 may be implemented in client station 100 to detect a preamble.

Analog-to-digital converter 505 is coupled to antenna 102. When downlink 110 is received at antenna 102, analog-to-digital converter 505 converts downlink 110 (e.g., the RF signals) to a digital format, such as one or more samples forming one or more symbols. In some implementations, downlink 110 may include one or more symbols formatted into a frame, such as frame 200. Analog-to-digital converter 505 is coupled to buffer 510 to hold (e.g., store) one or more symbols.

CP autocorrelator 515 receives from buffer 510 one or more symbols. CP autocorrelator 515 may receive a symbol and CP autocorrelate that symbol to generate an output signal, such as signal 400 including one or more peaks 402-412. In CP autocorrelation, the last samples of an OFDM symbol also appear at the beginning of the symbol to serve as a CP of the OFDM symbol. A CP autocorrelator may be implemented based on the following equation:

$$Z(n_1) = \sum_{k=1}^{L_{CP}} Y(n_1 - k) * Y^*(n_1 - k - D_{CP}),$$ Equation 1 wherein $Z(n_1)$ represents the output of CP autocorrelator 515; $L_{CP}$ represents the length in samples of the cyclic prefix (CP) of an OFDM symbol; $Y(n_1-k)$ represents the received samples forming an OFDM symbol (e.g., the output of buffer 510); $Y^*(n_1-k-D_{CP})$ represents the complex conjugate of $Y(n_1-k)$ delayed by $D_{CP}$; and $D_{CP}$ represents a distance between two correlated samples (e.g., $D_{CP}$ may be equal to the size of the FFT 525).

Guard interval locator 520 may detect the location of a guard interval based on peaks in the output of CP autocorrelator 515, the location of the peaks, and any corresponding distances among the peaks, as described above at 340.

In some implementation, the distance between peak 402 and peak 404 may be about equal to the length of an OFDM symbol $L_{OFDM}$. The distance between peaks 404 and 406 of downlink symbols 204 and 206 are also about equal to about the length of an OFDM symbol $L_{OFDM}$. The distance $L_{DU}$ between peak 406 of the last downlink symbol 208 and peak 408 of the first uplink symbol 212a is wider than the distance $L_{OFDM}$ since TTG 415 (see also 210 at FIG. 2) occurs between peaks 406 and 408. The distance $L_{DU}$ may be determined based on the following equation:

$$L_{DU} = L_{OFDM} + L_{TTG}$$ Equation 2, wherein $L_{TTG}$ is the length of the TTG.

The distances between peaks 408 and 410 of uplink burst symbol 212a is also about equal to $L_{OFDM}$; while the distance between peak 410 of the last uplink symbol (e.g., symbol 212b) and peak 412 of preamble 216 of a subsequent frame may be determined based on the following equation:

$$L_{UP} = L_{OFDM} + L_{RTG}$$ Equation 3, wherein $L_{RTG}$ is the length of RTG. The terms "distance" and "length" may each refer to any value including time, position, and the like. Guard interval locator 520 may thus use the distances and locations of aspects 202-216 of frame 200 to detect RTG 214 and TTG 210.

Guard interval locator 520 may be used to detect a peak from the so-called "noise floor." For example, any value in signal 400 of CP autocorrelator 515 that exceeds a threshold magnitude (e.g., 0.15) may be characterized as a peak rather than the noise floor of signal 400, although any other approach may be used to discriminate peaks from noise.

Once guard interval locator 520 detects peaks, guard interval locator 520 may determine among peaks 402-412 one or more distances, such as distances $L_{DU}$ and $L_{UP}$, as determined by Equations 2 and 3 above. As shown in FIG. 4, $L_{DU}$ and $L_{DU}$ (e.g., including TTG 210 and RTG 214) have a wider distance than the distance $L_{OFDM}$.

For example, given an FFT size of 1024 and a CP ratio of 1/8, the $L_{OFDM}$ is 1152 samples (e.g., 1024*(1+1/8)). Given both TTG and RTG at 80 microseconds (us) and a sampling rate of 10 MegaHertz (MHz), the length of the guard intervals corresponds to about 800 samples (i.e., $L_{RTG}=L_{TTG}=800$ samples). The distance $L_{OFDM}$ between peaks of uplink or downlink symbols (e.g., between peaks 404 and 406 and peaks 408 and 410) is 1152 samples. When an RTG or a TTG is present, the distances between peaks increases to about 1952 samples (see, e.g., Equations 2 and 3). A threshold distance may be used to detect whether a TTG or a RTG is present between any two peaks. The threshold distance $D_{Threshold}$ may be determined as a value anywhere between 1152 and 1952. In some implementations, the threshold distance is determined at about the middle of the range 1152 and 1952 (e.g., $D_{Threshold}=1552$). Although the above example provides specific values for $L_{RTG}$, $L_{TTG}$, $D_{Threshold}$, and the like, other values may be used as well.

When a distance between peaks is greater than $D_{Threshold}$, guard interval locator 520 determines that a guard interval, such as TTG 210 or RTG 214, is likely present between those peaks. However, if RTG 214 is between those peaks, RTG 214 would also have a location that is after TTG 212 and a location that would be followed by preamble 216.

Guard interval locator 520 provides peak location 590 of a symbol following RTG 214 or TTG 210 to buffer 510, so that buffer 510 can provide the corresponding one or more symbols to FFT 525. FFT 525 performs a Fast Fourier Transform of the one or more symbols. Although FFT 525 uses a Fast Fourier Transform, other transforms may be used as well.

Preamble verifier 530 uses a metric to verify whether the one or more symbols at location 590 are indeed the preamble. In some implementations, the metric is determined in the frequency domain. For example, the metric described above at 340 may be used to determine whether a symbol at location 590 corresponds to BPSK modulation—verifying that the symbol corresponds to a preamble. Although the metric may be determined in a variety of ways, in some implementations the metric described below with respect to Equation 17 is used at 340. Preamble verifier 530 may indicate whether the preamble is present and provide a peak location 590 (e.g., sample number, time, distance, and the like) of the preamble.

Figure 6:
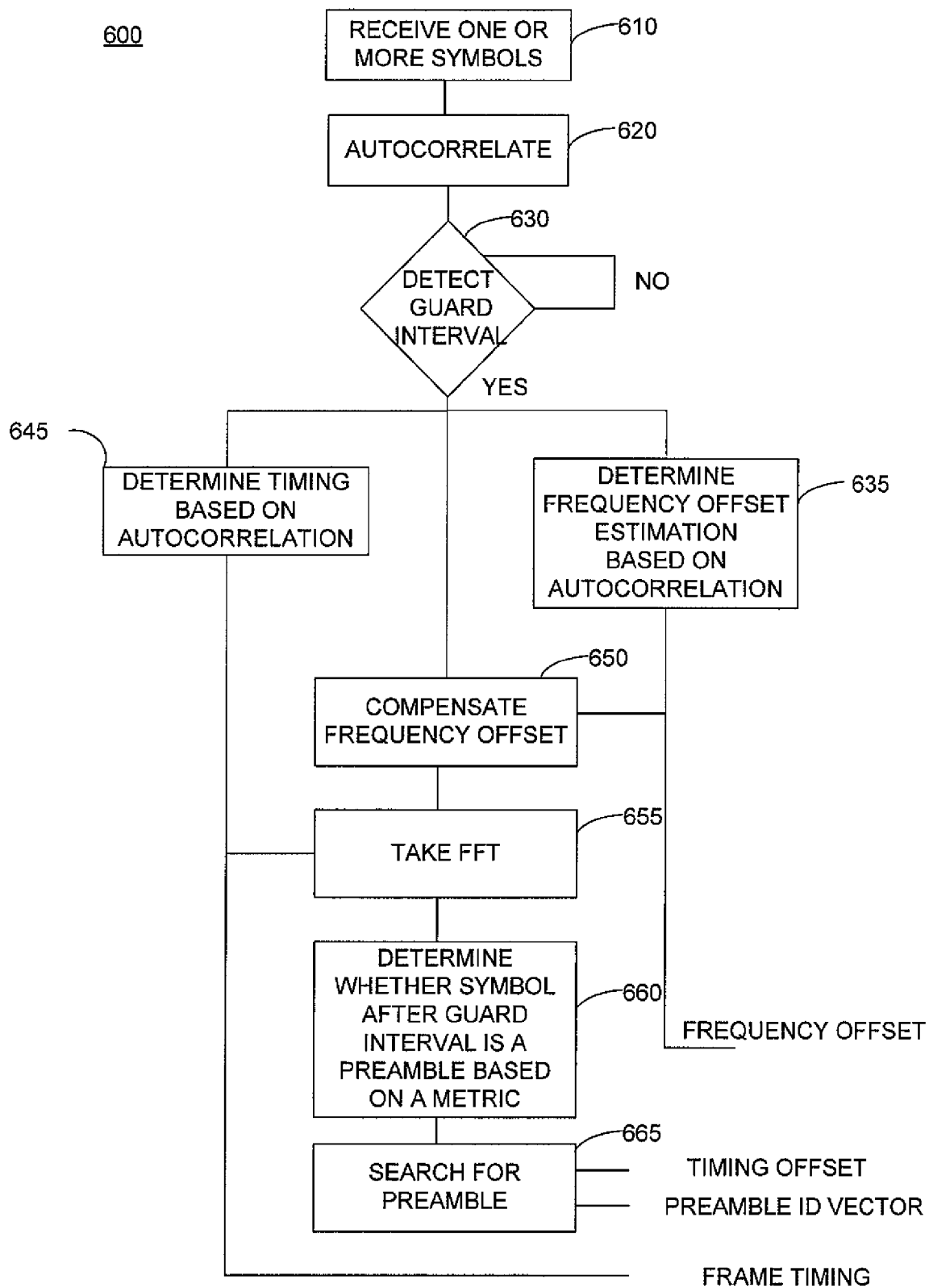
FIG. 6 depicts another process for detecting a guard interval, such as a receive/transmit transition gap.

FIG. 6 depicts another process 600 for detecting the preamble. The process 600 is similar to process 300 in some respects but includes additional features, as described further below.

At 610-630, one or more symbols are received, autocorrelated, and a guard interval (also referred to as a gap, a band, and the like) is detected as described above with respect to 310-330.

At 635, system 500 determines a frequency offset of the signal received at antenna 102. The frequency offset adjusts the frequency of the signal received at client station 100 to match the frequency of the signal transmitted by base station 190. For example, differences between the local oscillators of base station 190 and client station 100 and the wireless channel itself may contribute to a frequency difference requiring a frequency offset correction. Although there are various ways to determine a frequency offset and correct for the frequency offset, in one implementation, the normalized frequency offset may be determined based on the following equation:

$$\theta(n_1) = \frac{1}{2\pi} \cdot \text{angle}[Z(n_1)] = \frac{\Delta f}{f_{sc}} \qquad \text{Equation 4}$$

wherein $\theta(n_1)$ represents the frequency offset determined at one of the peaks $Z(n_1)$; and angle [ ] represents the function of determining the angle of a complex variable $Z(n_1)$. The units of $\theta(n_1)$ may be given by the carrier spacing. That is, $\theta(n_1)$ is in units of the sub-carrier spacing, so that frequency offset in Hertz may be given as the following equation:

$$\Delta f = \theta(n_1) \cdot f_{sc} \qquad \text{Equation 5,}$$

wherein $f_{sc}$ is the frequency spacing of the OFDM sub-carriers in Hertz, and $\Delta f$ represents the frequency offset in Hertz.

At 650, the frequency offset determined at 635 is used to correct the frequency of the symbols provided by buffer 510. For example, before taking the FFT at 655, the symbols are corrected based on the frequency offset $\theta(n_1)$. The corrected output of 650 may be represented based on the following equation:

$$\tilde{Y}(n_1 - k) = Y(n_1 - k) \cdot e^{j\frac{2\pi}{N} \cdot \theta(n_1) \cdot (-k)}, \qquad \text{Equation 6}$$

wherein $\theta(n_1)$ represents the normalized frequency offset; k represents the index of time-domain samples (e.g., k=1, 2, ..., $L_{OFDM}$); $\tilde{Y}(n_1-k)$ represents the compensated time-domain samples provided to FFT 525; and $Y(n_1-k)$ represents the time-domain samples from buffer 515 before compensation; and $n_1$ represents a current time-domain samples index.

At 645, system 500 determines a timing based on the autocorrelation. The timing is an approximate measure of where a symbol starts based on peak location 590. When it is confirmed that the symbol is a preamble (e.g., by following detection process 600 including 660 at FIG. 6), the timing of the symbol determined at 645 then becomes an approximate measure of where the frame starts. The timing determined at 645 is provided to FFT 525, so that the FFT may begin at the correct location. For example, the timing information may be used to determine where to apply a window when taking FFT 655.

At 655, FFT 525 takes an FFT of one or more symbols after the detected guard interval of 630. FFT 525 may take the FFT based on a timing determined at 645. Moreover, the frequency offset compensation at 650 may be performed on the symbols before taking the FFT of the symbols.

At 660, preamble verifier 530 determines whether the FFT of the symbols corresponds to the preamble. As described above at 340, preamble verifier 530 may determine a metric to verify that the symbols at peak location 590 correspond to a preamble.

In the frequency domain (e.g., after the FFT at 655), if a symbol corresponds to a preamble, the modulating numbers $\tilde{M}_p(k)$ of the sub-carriers may be distributed at, or near, the real axis (i.e., representing real numbers, such as frequency domain samples, modulating sub-carriers). Given the effects of timing, the communication channel, and noise, when a symbol is transformed into the frequency domain samples using FFT 525, the modulating numbers $\tilde{M}_p(k)$ are dispersed over a complex plane (e.g., representing frequency domain samples having real and imaginary components). To compensate for the dispersion, the one or more frequency domain samples (after the FFT) are differentiated (e.g., differentiated detection is applied) and a timing offset correction is applied.

The differentiated one or more frequency domain samples may be represented by the following equation:

$$\tilde{P}(k) = \tilde{M}^*(k)\tilde{M}(k+1) \qquad \text{Equation 7,}$$

wherein $\tilde{P}(k)$ represents the differentiated one or more frequency domain samples; $\tilde{M}^*(k)$ represents the complex conjugate of the one or more frequency domain samples used to modulate the sub-carrier; $\tilde{M}(k+1)$ represents the next frequency domain samples; and k=1, 2, ..., ($L_{PN}-1$), where $L_{PN}$ is the preamble code length in number of bits.

For a time-varying, multi-path communication channel with a frequency-domain channel response of $C_{Seg}(k,t)$, the one or more frequency domain samples provided by FFT 525 may be represented as follows:

$$\tilde{M}(k) = M(k) \cdot C_{Seg}(k, t) \cdot e^{j\frac{2\pi}{N}k\Delta}, \qquad \text{Equation 8}$$

wherein Seg=0, 1, 2 is the segment index; k=1, 2, ..., $L_{PN}$; t is the time, which can be represented by the symbol index; $\Delta$ represents the timing offset; $M(k)$ represents the modulated frequency-domain samples; and N represents the size of the FFT 525.

Equations 7 and 8 may be represented as follows:

$$\tilde{P}(k) = \left(M(k) \cdot C_{Seg}(k, t) \cdot e^{j\frac{2\pi}{N}k\Delta}\right)^* \qquad \text{Equation 9}$$
$$\left(M(k+1) \cdot C_{Seg}(k+1, t) \cdot e^{j\frac{2\pi}{N}(k+1)\Delta}\right),$$

wherein $\tilde{P}(k)$ represents the differentiated frequency-domain samples; and * represents the complex conjugate.

For a communication channel with a coherent bandwidth wider than the 6 or more sub-carriers, the following may be used to simplify Equation 9:

$$C_{Seg}(k,t) \approx C_{Seg}(k+1,t) \qquad \text{Equation 10,}$$

The simplification results in Equation 9 to be rewritten as follows:

$$\tilde{P}(k) \approx M^*(k)M(k+1) \cdot |C_{Seg}(k, t)|^2 e^{j\frac{2\pi}{N}\Delta}. \qquad \text{Equation 11}$$

When the one or more frequency domain samples correspond to a preamble, the frequency domain samples may be modulated by + or -1 (e.g., BPSK: $M(k)=M_p(k)=\pm 1$). The one or more frequency domain samples, which when differentiated, may thus be represented as follows:

$$\tilde{P}(k) = \pm 1 \cdot |C_{Seg}(k, t)|^2 e^{j\frac{2\pi}{N}\Delta}, \qquad \text{Equation 12}$$

wherein | | represents the function of an absolute value.

While Õ(k) may be represented as the following:

$$\tilde{O}(k) = \tilde{P}(k) \cdot \text{sign}[\text{real}(\tilde{P}(k))] = |C_{Seg}(k,t)|^2 e^{j\frac{2\pi}{N}\tilde{\Delta}}, \quad \text{Equation 13}$$

wherein Õ(k) represents the differentiated frequency domain samples; sign[ ] represents the sign function of $$f(x) = \begin{cases} +1, & x \geq 0 \\ -1, & x < 0 \end{cases};$$

and real( ) represents a function that provides the real components of a complex number.

The timing offset compensation corrects for rotations in phase introduced by imperfect timing of FFT or the wireless communication channel. The timing offset may be estimated from the Õ(k) based on the following equation:

$$\tilde{\Delta} = \frac{N}{2\pi} \text{angle}\left(\sum_{k=1}^{L_{PN}-1} \tilde{O}(k)\right), \quad \text{Equation 14}$$

wherein $\tilde{\Delta}$ represents the timing offset used to correct the frequency domain samples for any phase rotations induced by imperfect timing of FFT or the communication channel (e.g., multi-path, interference, and the like). Timing offset $\tilde{\Delta}$ may be applied to the differentiated symbols Õ(k) based on the following equation:

$$\hat{O}(k) = \tilde{O}(k) e^{-j\frac{2\pi}{N}\tilde{\Delta}}, \quad \text{Equation 15}$$

wherein Ô(k) represents the frequency domain samples corrected for timing offset (i.e., phase rotation).

Figure 7:
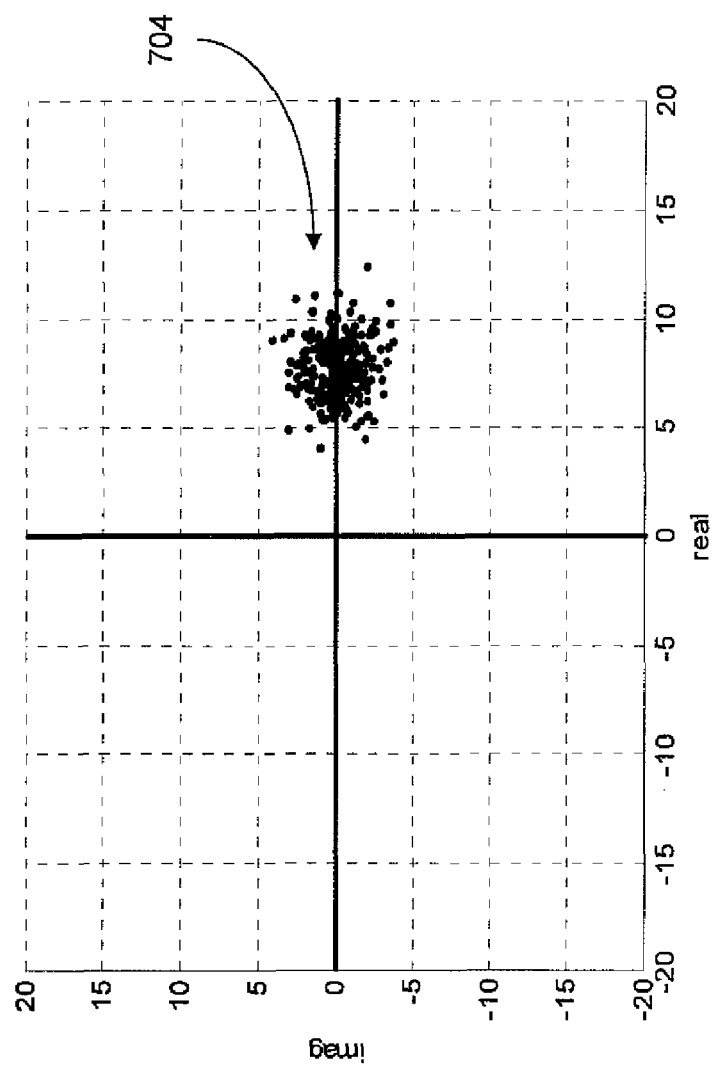
FIG. 7 depicts a plot of the samples of a preamble in the frequency domain after detection processing.

FIG. 7 depicts a plot of frequency domain samples provided by FFT 525 to preamble verifier 530. When the symbol Ô(k) (e.g., differentiated and corrected for timing offset) is a preamble. Referring to FIG. 7, the frequency domain samples 704 are clustered around the real axis.

Based on Equations 13 and 15, Õ(k) may also be represented as follows:

$$\hat{O}(k) = \tilde{O}(k) e^{-j\frac{2\pi}{N}\tilde{\Delta}} \quad \text{Equation 16}$$
$$= |C_{Seg}(k,t)|^2 e^{j\frac{2\pi}{N}\tilde{\Delta}} e^{-j\frac{2\pi}{N}\tilde{\Delta}}$$
$$\approx |C_{Seg}(k,t)|^2.$$

When a preamble is present in the frequency domain samples provided from FFT 525 to preamble verifier 530, Ô(k) may be distributed at 704 around the real axis on the right-hand-side of the complex plane, as indicted by FIG. 7. Preamble verifier 530 may determine a metric $R_{RI}$ to verify whether BPSK modulation is being used, which indicates a preamble is present. The metric may provide an indication of whether the frequency domain samples are modulated using real components (e.g., in FIG. 7, the Ô(k) is distributed around real axis). Preamble verifier 530 may determine metric $R_{RI}$ based on the following equation:

$$R_{RI} = \frac{\sum_{k=1}^{L_{PN}-1}(\text{real}(\hat{O}(k)))^2}{\sum_{k=1}^{L_{PN}-1}(\text{imag}(\hat{O}(k)))^2}, \quad \text{Equation 17}$$

wherein imag( ) represent that the imaginary part of Ô(k) is used; and real( ) represent that the real part of Ô(k) is used. In some implementations, a metric $R_{RI}$ greater than about 1 indicates that real frequency domain samples rather than complex frequency domain samples are present. When this is the case, the metric verifies that the one or more symbols are a preamble. Moreover, a metric $R_{RI}$ greater than about 2.5 represents with a higher degree of confidence that the one or more symbols represent a preamble, although other metric values may be used as well to verify that a symbol corresponds to a preamble. On the other hand, when metric $R_{RI}$ is about equal to 1 or less than 1 the one or more symbol are not likely to be a preamble.

At 665, system 500 searches for a preamble, e.g., the preamble identifier (ID). For example, in WiMAX, a predefined set of preambles may be used (e.g., 144 preamble IDs). Moreover, these preambles may be a PN (pseudo noise) sequence. The preamble IDs may enable a client station to distinguish a base station from other base stations.

For a set of preambles, system 500 may differentiate the set of preamble samples as follows:

$$U^i(k) = M_p^{i*}(k) M_p^i(k+1) \quad \text{Equation 18},$$

wherein $U^i(k)$ represents the $i^{th}$ preamble sequence after differentiation; $M_p^i(k)^*$ represents the complex conjugate of the $k^{th}$ sample of the $i^{th}$ preamble sequence (e.g., a PN sequence) in the set of preamble sequences; and $M_p^i(k+1)$ represents the $(k+1)^{th}$ sample of $i^{th}$ preamble sequence.

System 500 may compensate timing offset on $\tilde{P}(k)$ (see Equations 13-14 above) by multiplying the timing offset $\tilde{\Delta}$ based on the following equation:

$$\hat{P}(k) = \tilde{P}(k) \cdot e^{-j\frac{2\pi}{N}\tilde{\Delta}}. \quad \text{Equation 19}$$

System 500 may cross correlate the differentiated frequency domain samples (e.g., from the symbol determined to be a preamble at 660) $\hat{P}(k)$ with each of the set of differentiated preambles $U^i(k)$ to detect a preamble ID. For example, the cross correlation of $\hat{P}(k)$ and each one of the preambles $U^i(k)$ results in a maximum. The preamble ID of the differentiated preambles $U^i(k)$ having a maximum cross correlation with preamble $\hat{P}(k)$ is the preamble ID identified at 665.

Figure 8:
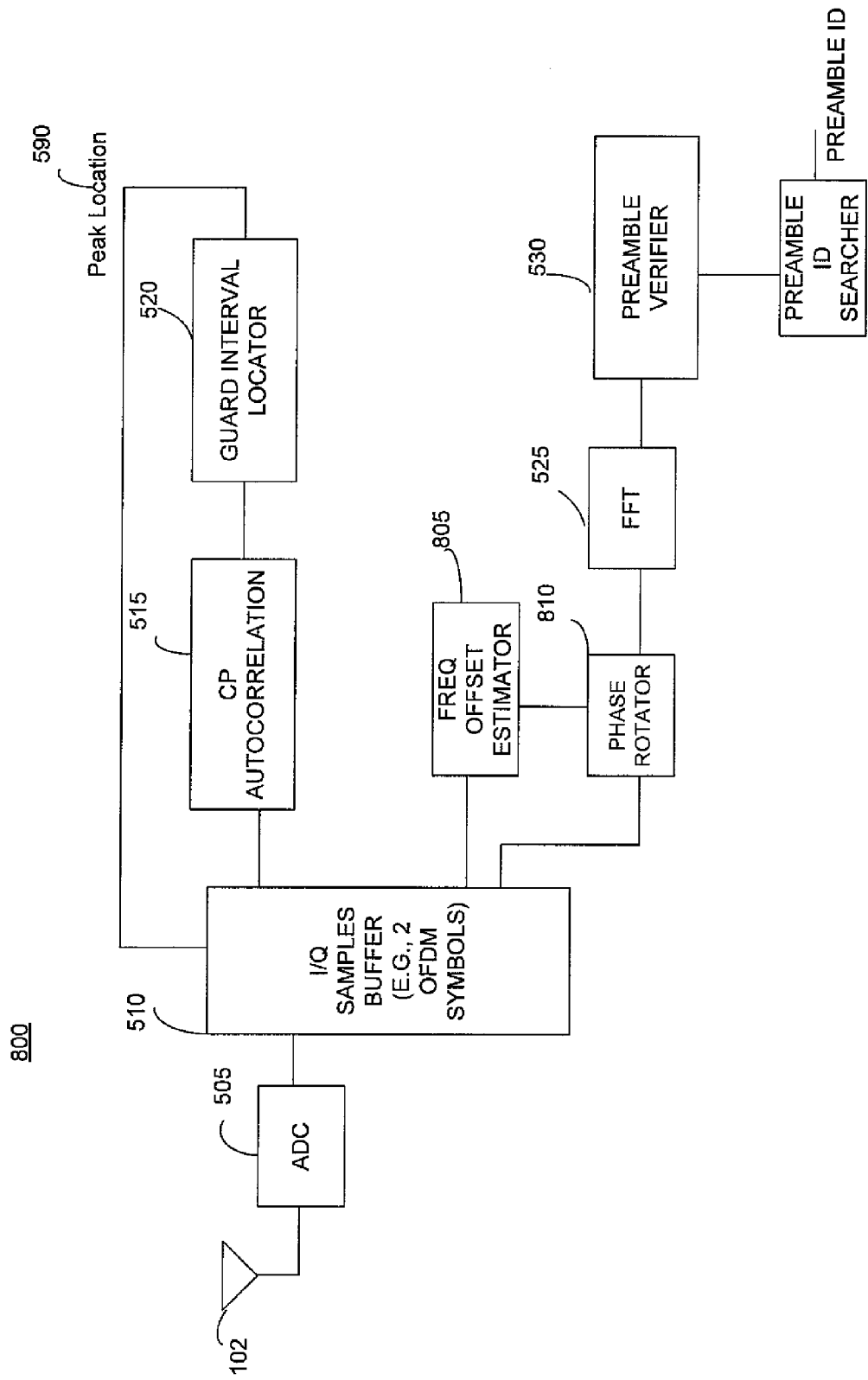
FIG. 8 depicts another receiver for detecting a guard interval, such as a receive/transmit transition gap.

FIG. 8 depicts a system 800. System 800 is similar to system 500 in many respects but further includes frequency offset 805 and phase rotator 810.

Frequency offset estimator 805 performs the frequency offset estimation described above at 635, while phase rotator 810 rotates the phase of the time-domain samples of the symbols, as described above with respect to Equations 4, 5 and 6 to enable determination of the metric $R_{RI}$ (see, e.g., Equation 17). System 800 also includes a preamble ID searcher to identify the preamble ID as described above with respect to 665.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method for use in a wireless receiver, the method comprising:
    receiving a plurality of symbols;
    detecting, from an autocorrelation of the received symbols, a guard interval representative of a receive/transmit transition gap (RTG);
    verifying, based on a metric, whether at least one symbol positioned after the detected guard interval is a preamble;
    determining the metric based on a ratio of a first magnitude of at least one real component of the at least one symbol and a second magnitude of at least one imaginary component of the at least one symbol, the determination using a Fast Fourier Transform (FFT) of the at least one symbol; and
    providing an indication that the at least one symbol is likely the preamble, when the ratio is greater than about 1.

2. A method for use in a wireless receiver, the method comprising:
    receiving a plurality of symbols;
    detecting, from an autocorrelation of the received symbols, a guard interval representative of a receive/transmit transition gap (RTG);
    verifying, based on a metric, whether at least one symbol positioned after the detected guard interval is a preamble, wherein the metric is based on the following equation:

$$R_{RI} = \frac{\sum_{k=1}^{L_{PN}-1} (\text{real}(\hat{O}(k)))^2}{\sum_{k=1}^{L_{PN}-1} (\text{imag}(\hat{O}(k)))^2}.$$

3. The method of claim 1, wherein detecting further comprises:
    determining at least one distance between at least two peaks detected from the autocorrelation of the received symbols, the autocorrelation implemented as a cyclic prefix (CP) autocorrelation.

4. The method of claim 3 further comprising:
    indicating a location of the RTG, when the at least one distance exceeds a threshold.

5. The method of claim 4 further comprising:
    transforming the at least one symbol positioned after the location of the RTG.

6. The method of claim 5, wherein transforming further comprises:
    transforming using a Fast Fourier Transform (FFT).

7. The method of claim 6 further comprising:
    compensating, before performing the transformation, for at least one of a frequency offset and a phase rotation;
    providing a timing estimation to enable the transformation; and
    searching for a preamble identifier by searching a set of preamble identifiers.

8. The method of claim 1, wherein receiving further comprises:
    receiving the plurality of symbols as a complex signal comprising an I signal and a Q signal.

9. A system comprising:
    a processor; and
    a memory, wherein the processor and the memory are configured to perform a method comprising:
    receiving a plurality of symbols;
    detecting, from an autocorrelation of the received symbols, a guard interval representative of a receive/transmit transition gap (RTG);
    verifying, based on a metric, whether at least one symbol positioned after the detected guard interval is a preamble;
    determining the metric based on a ratio of a first magnitude of at least one real component of the at least one symbol and a second magnitude of at least one imaginary component of the at least one symbol, the determination using a Fast Fourier Transform (FFT) of the at least one symbol; and
    providing an indication that the at least one symbol is likely the preamble, when the ratio is greater than about 1.

10. The system of claim 9 further comprising:
    determining the metric based on a first magnitude of at least one real component of the at least one symbol and a second magnitude of at least one imaginary component of the at least one symbol, the determination using a Fast Fourier Transform (FFT) of the at least one symbol.

11. The system of claim 9 further comprises:
a buffer; and
a cyclic prefix autocorrelator for correlating at least one of the plurality of symbols.

12. The system of claim 9 further comprising:
determining a timing offset representing phase rotation of the plurality of symbols.

13. An article comprising a non-transitory machine-readable medium embodying instructions that when performed by one or more machines result in operations comprising:
receiving a plurality of symbols;
detecting, from an autocorrelation of the received symbols, a guard interval representative of a receive/transmit transition gap (RTG);
verifying, based on a metric, whether at least one symbol positioned after the detected guard interval is a preamble;
determining the metric based on a ratio of a first magnitude of at least one real component of the at least one symbol and a second magnitude of at least one imaginary component of the at least one symbol, the determination using a Fast Fourier Transform (FFT) of the at least one symbol; and
providing an indication that the at least one symbol is likely the preamble, when the ratio is greater than about 1.

14. The article of claim 13 further comprising:
determining the metric, wherein the determined metric provides a value representative of whether the at least one symbol was transmitted using binary phase shift key (BPSK) modulation.

15. The article of claim 13 further comprising:
determining the metric based on a first magnitude of at least one real component of the at least one symbol and a second magnitude of at least one imaginary component of the at least one symbol, the determination using a Fast Fourier Transform (FFT) of the at least one symbol.

16. The article of claim 15, wherein determining further comprises:
determining the metric as a ratio of the first magnitude to the second magnitude.

17. A system comprising:
means for receiving a plurality of symbols;
means for detecting, from an autocorrelation of the received symbols, a guard interval representative of a receive/transmit transition gap (RTG); and
means for verifying, based on a metric, whether at least one symbol positioned after the detected guard interval is a preamble;
means for determining the metric based on a ratio of a first magnitude of at least one real component of the at least one symbol and a second magnitude of at least one imaginary component of the at least one symbol, the determination using a Fast Fourier Transform (FFT) of the at least one symbol; and
means for providing an indication that the at least one symbol is likely the preamble, when the ratio is greater than about 1.

* * * * *